United States Patent
Mikami

(10) Patent No.: US 6,701,070 B2
(45) Date of Patent: Mar. 2, 2004

(54) APERTURE STOP CHANGING DEVICE FOR CAMERA

(75) Inventor: Yuji Mikami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 54 days.

(21) Appl. No.: 10/012,555

(22) Filed: Dec. 12, 2001

(65) Prior Publication Data

US 2002/0090220 A1 Jul. 11, 2002

(30) Foreign Application Priority Data

Dec. 13, 2000 (JP) ........................................ 2000-378608
Dec. 19, 2000 (JP) ........................................ 2000-384704

(51) Int. Cl.⁷ .............................................. G03B 17/02

(52) U.S. Cl. ............................ 396/6; 396/179; 396/459; 396/505

(58) Field of Search ............................ 396/6, 179, 458, 396/459, 505

(56) References Cited

U.S. PATENT DOCUMENTS 2,956,491 A * 10/1960 Fischer et al. .............. 396/233
6,418,278 B1 * 7/2002 Bittner ........................ 396/195

* cited by examiner

*Primary Examiner*—David M. Gray
(74) *Attorney, Agent, or Firm*—Young & Thompson

(57) ABSTRACT

A camera includes a preset open aperture for introducing object light to photo film. A taking lens is disposed in a light path of the object light, and has two lens elements. In the camera, an aperture stop changing device is provided. An aperture changing plate includes a stop-down opening having a small diameter, is disposed close to the taking lens, is movable between a small diameter position and a large diameter position. The stop-down opening, when the aperture changing plate is in the small diameter position, is set in the light path for stopping down the preset open aperture, and when the aperture changing plate is in the large diameter position, is set away from the light path. A spacer is secured to a partial section of a peripheral portion of the taking lens, for defining a passage gap or cutout at a remaining partial section of the peripheral portion of the taking lens. The passage cutout allows passage of the aperture changing plate moving between the small and large diameter positions.

28 Claims, 13 Drawing Sheets

APERTURE STOP CHANGING DEVICE FOR CAMERA

BACKGROUND OF THE INVENTION

1. Field of the Invention

The present invention relates to an aperture stop changing device for a camera. More particularly, the present invention relates to an aperture stop changing device for a camera having a simple structure, and also in which performance of a taking lens can be free from being influenced by the relevant elements for the aperture stop changing.

2. Description Related to the Prior Art

A lens-fitted photo film unit is a single use camera pre-loaded with photo film. Various mechanisms and elements in the lens-fitted photo film unit are simplified for the purpose of lowering the manufacturing cost. The lens-fitted photo film unit includes a shutter unit which a single shutter blade is biased in a closed position, and is knocked instantaneously toward an open position so as to take an exposure by opening and closing a shutter opening. In addition to the shutter unit, the lens-fitted photo film unit is provided with an aperture stop changing mechanism for the purpose of adjusting an exposure. An aperture changing plate of the aperture stop changing mechanism includes a stop-down opening, is movable but is different from the shutter blade. A photometric value or brightness is measured, according to which the aperture changing plate is changed over to change the aperture stop.

The aperture changing plate is movable between first and second positions, and when in the first position, sets the stop-down opening in the light path, and when in the second position, sets away the stop-down opening from the light path. Control of a solenoid causes the aperture changing plate to move, to change over an aperture stop. A photoreceptor is provided, and started upon depression of a shutter release button to detect an amount of object light. The solenoid is actuated by evaluating the object light amount. Therefore, it is possible to adjust an exposure even by use of a simple construction.

To reduce the manufacturing cost, the lens-fitted photo film unit is a structurally simplified product even in relation to a taking lens. Generally, the taking lens is constituted by one or two lens elements 20. Specifically, the type of the taking lens having two lens elements is advantageous, as effective in compensation for aberrations. Behind the taking lens is disposed a preset open aperture defining an open aperture in the lens-fitted photo film unit. A lens holder having a holder barrel portion is disposed on a front side of the preset open aperture. A first one of the lens elements is disposed on the rear side, and has a large diameter. A second one of the lens elements is disposed on the front side, and has a small diameter.

If the lens-fitted photo film unit having the taking lens of the two-lens-element type is provided with the aperture stop changing mechanism as described above, it is preferable to dispose the aperture changing plate between the lens elements, because of structures of elements near the end holder, and because high quality can be obtained and the camera should be compactly designed. The stop-down opening moves in a path and settable even to the front of the taking lens. If the aperture changing plate is inserted between the lens elements, it is likely that an end or tip of the aperture changing plate contacts and interferes with a lens surface to scratch or damage the same. It is also conceivable to dispose members for keeping the aperture changing plate positioned in the optical axis direction to avoid interference with the lens surface. However, this raises the number of the required parts, and is inconsistent to reducing the product size. This is not preferable due to those problems.

SUMMARY OF THE INVENTION

In view of the foregoing problems, an object of the present invention is to provide an aperture stop changing device for a camera having a simple structure, and also in which performance of a taking lens can be free from being influenced by the relevant elements for the aperture stop changing.

Another object of the present invention is to provide an aperture stop changing device for a camera in which an aperture changing plate can be positioned to move on a suitable plane, and can be prevented from interference with a lens surface.

In order to achieve the above and other objects and advantages of this invention, an aperture stop changing device for a camera is provided. The camera includes a preset open aperture for introducing object light to photo film, and a taking lens disposed in a light path of the object light, and having at least one lens element. In the aperture stop changing device, an aperture changing plate includes a stop-down opening having a small diameter, is disposed close to the taking lens, is movable between a small diameter position and a large diameter position, wherein the stop-down opening, when the aperture changing plate is in the small diameter position, is set in the light path for stopping down the preset open aperture, and when the aperture changing plate is in the large diameter position, is set away from the light path. A spacer is secured to a partial section of a peripheral portion of the taking lens, for defining a passage gap or cutout at a remaining partial section of the peripheral portion of the taking lens, the passage cutout allowing passage of the aperture changing plate moving between the small and large diameter positions.

The camera is a lens-fitted photo film unit.

Furthermore, a guide projection portion is formed to project from the peripheral portion of the taking lens toward the aperture changing plate, for contacting the aperture changing plate being moved, to regulate the aperture changing plate in an optical axis direction of the taking lens.

Furthermore, a lens holder is disposed behind the taking lens, for supporting the taking lens.

The guide projection portion is a ring-shaped ridge.

Furthermore, a retention plate is disposed in front of the taking lens, for securing the taking lens to the lens holder. A first retention portion is formed with the lens holder or the retention plate. A second retention portion is formed to project from a peripheral edge of the taking lens, fitted on the first retention portion, for retaining the taking lens on the lens holder or the retention plate.

Furthermore, a holder barrel portion is formed to project from a front surface of the lens holder, and fitted on the peripheral edge of the taking lens. A passage cutout is formed in the holder barrel portion, for allowing the aperture changing plate to move in and out.

Furthermore, a ring-shaped outer ridge is formed to project backwards from the retention plate, fitted on a peripheral edge of the holder barrel portion, for positioning to the lens holder.

The first retention portion is a retention cutout formed in the outer ridge, and the second retention portion is a retention projection.

Furthermore, a biasing mechanism biases the aperture changing plate to the small diameter position. A stopper portion is disposed in a moving path of the aperture changing plate, for contacting the aperture changing plate moved by the biasing mechanism, to keep the aperture changing plate from moving beyond the small diameter position.

Furthermore, a ring-shaped first positioning ridge is formed to project backwards from the retention plate, disposed inside the outer ridge, for pushing the peripheral portion of the taking lens.

Furthermore, a ring-shaped second positioning ridge is formed to project from a front surface of the taking lens, fitted on the first positioning ridge, for positioning the taking lens behind the retention plate.

According to a preferred embodiment, the spacer is a spacer projection formed to project from the lens holder toward the taking lens.

The aperture changing plate is disposed between the taking lens and the lens holder, the guide projection portion projects from a rear surface of the taking lens, and the spacer projection has a height equal to or more than a height of the guide projection portion.

Furthermore, a ring-shaped positioning projection is formed to project from a rear surface of the taking lens, and fitted on the spacer projection.

According to another preferred embodiment, the at least one lens element is at least first and second lens elements. The aperture changing plate is disposed between the first and second lens elements, the spacer is sandwiched by partial sections of peripheral portions of the first and second lens elements opposed to one another, and the passage cutout is defined between remaining partial sections of the peripheral portions of the first and second lens elements.

The second lens element is disposed in front of the first lens element, and the guide projection portion projects from a front surface of the first lens element.

Furthermore, a holder barrel portion is formed to project forwards from the lens holder, and fitted on a peripheral edge of the second lens element. A passage cutout is, formed in the holder barrel portion, for allowing the aperture changing plate to move in and out. A retention notch is formed in the holder barrel portion. A retention projection is formed to project radially from a peripheral edge of the spacer, fitted in the retention notch, for retaining the spacer on the lens holder.

Furthermore, a ring-shaped flare stopper is disposed close to the first or second lens element, for blocking light traveling away from the light path of the object light, to prevent flare.

The flare stopper is disposed between the aperture changing plate and the second lens element, for regulating the aperture changing plate with the guide projection portion.

The flare stopper contacts the aperture changing plate moving between the small and large diameter positions, for regulation in the optical axis direction.

Furthermore, a support pin is formed to project forwards from the lens holder, for supporting the aperture changing plate in a rotatable manner. The lens holder and the retention plate are disposed to cover a moving path of the aperture changing plate between the small and large diameter positions.

The aperture changing plate has a driven end. Furthermore, a solenoid has a plunger slidable between first and second positions. A transmission mechanism is connected between the plunger and the aperture changing plate, has a driving end movable into and out of a moving path of the driven end, wherein the driving end, if the plunger is in the first position, is away from the driven end for setting the aperture changing plate in the small diameter position, and if the plunger is in the second position, pushes the driven end for setting the aperture changing plate in the large diameter position.

Furthermore, a photometric unit measures object brightness. A control circuit controls the solenoid according to comparison of the object brightness with reference brightness, to set the solenoid in the first position if the object brightness is equal to or higher than the reference brightness, and to set the solenoid in the second position if the object brightness is lower than the reference brightness.

Furthermore, a first bias member biases the aperture changing plate toward the small diameter position. The transmission mechanism includes a stopper lever, having first and second ends, the first end being secured to and moved by the plunger, being in a third position when the plunger is in the first position, and being in a fourth position when the plunger is in the second position. A transmission lever is movable between fifth and sixth positions, has a third end and the driving end, the third end being movable into and out of a moving path of the second end, wherein the third end, when the stopper lever is in the third position, is retained in the fifth position, to set the aperture changing plate in the small diameter position, and when the stopper lever is in the fourth position, is allowed to move to the sixth position. A second bias member biases the transmission lever toward the sixth position, to set the aperture changing plate in the large diameter position.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
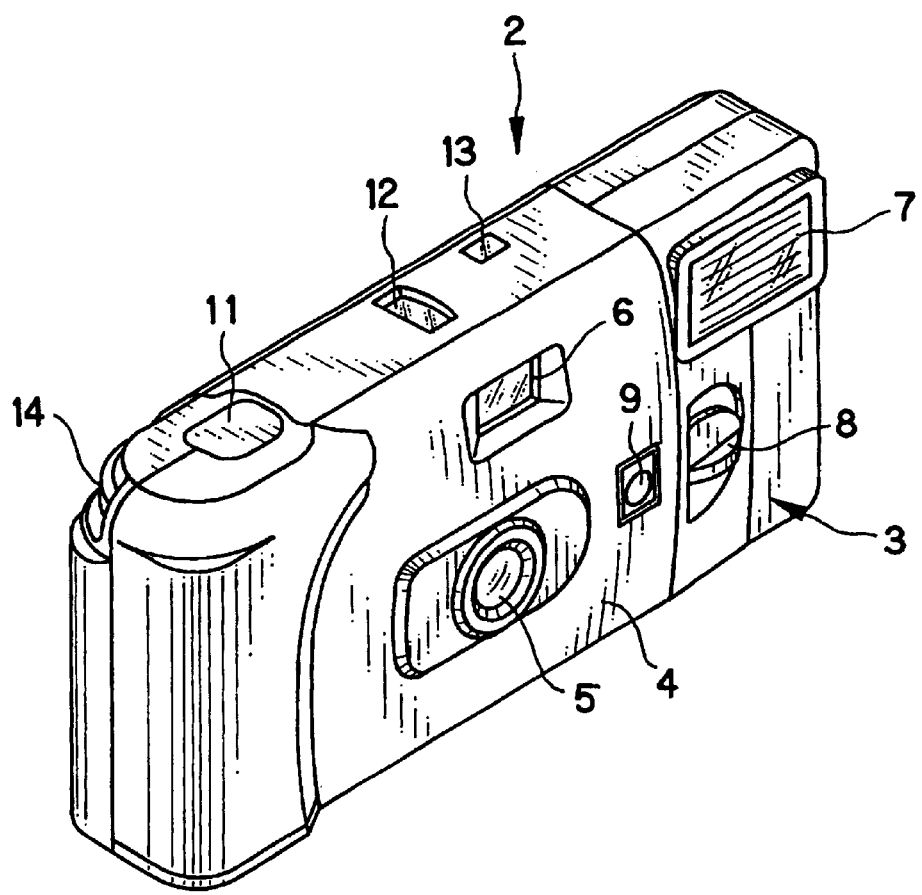
FIG. 1 is a perspective illustrating a lens-fitted photo film unit.

In FIG. 1, a camera or lens-fitted photo film unit 2 is illustrated. The lens-fitted photo film unit 2 includes a housing 3 and a sticker belt 4. The housing 3 accommodates a construction for taking an exposure. The sticker belt 4 covers a portion of the outer surface of the housing 3. A front of the housing 3 has a taking lens 5, a viewfinder objective window 6, a flash emitter 7, a flash charger button 8 and a photometric unit 9. An upper side of the housing 3 has a shutter release button 11, a frame counter window 12 and a light guide 13. The frame counter window 12 indicates the number of remaining frames available for exposures. The light guide 13 illuminates to indicate a state of completion of charging the flash. The rear of the housing 3 has a winder wheel 14, an eyepiece viewfinder window and the like.

Figure 2:
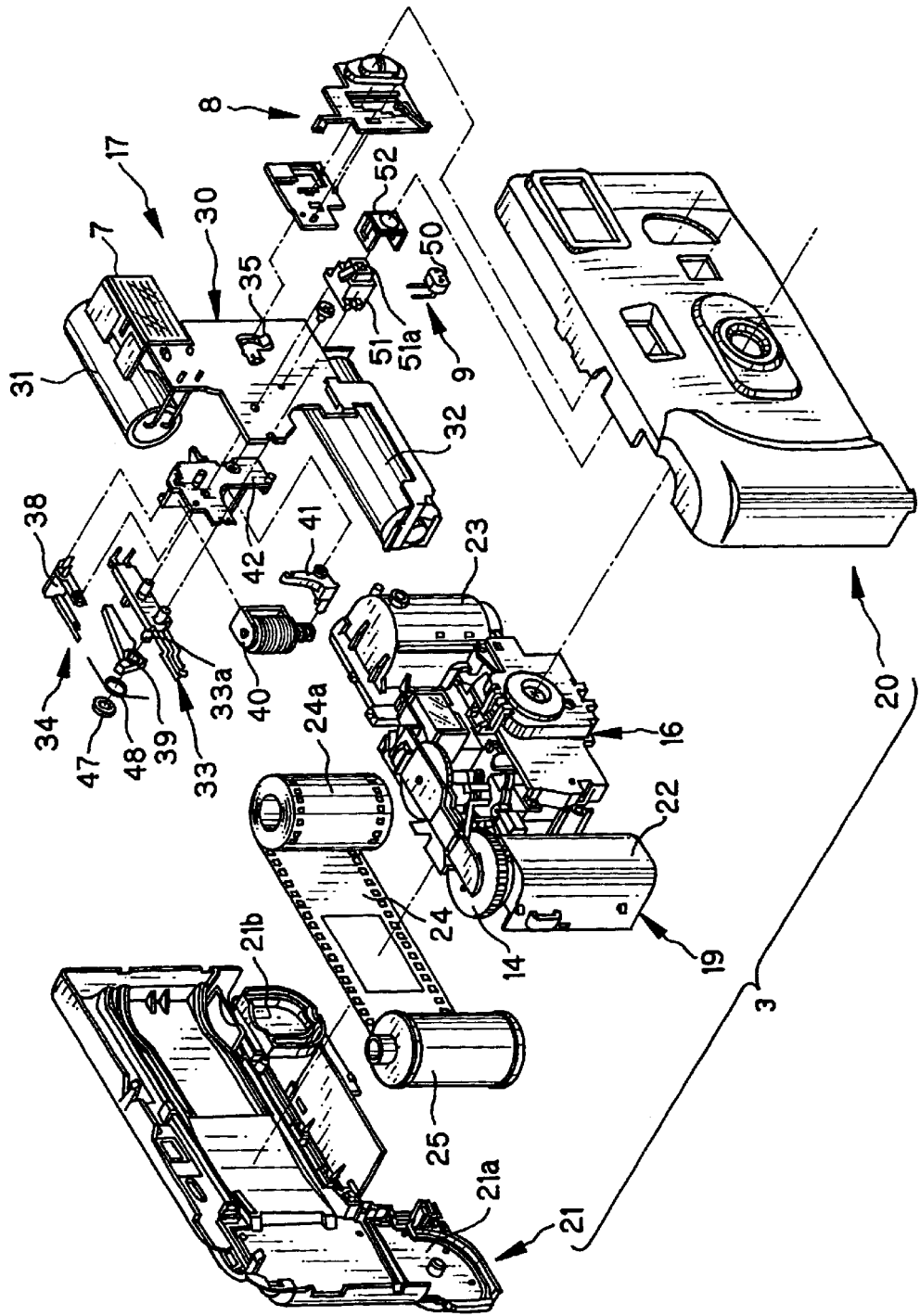
FIG. 2 is an exploded perspective illustrating the lens-fitted photo film unit.

In FIG. 2, the housing 3 includes a main body 19, a front cover 20 and a rear cover 21. The main body 19 includes an exposure unit 16 and a flash unit 17. The front cover 20 and the rear cover 21 cover the front and rear of the main body 19. In the front cover 20 are formed various openings for external access of the taking lens 5, the viewfinder objective window 6, the flash emitter 7, the flash charger button 8, the photometric unit 9 and the like.

A cassette holder chamber 22 and a roll holder chamber 23 are formed between the rear cover 21 and the main body 19. A photo film path is defined by the inside of the rear cover 21 at an exposure aperture behind the main body 19, and extends from the roll holder chamber 23 to the cassette holder chamber 22. A photo film cassette 25 is contained in the cassette holder chamber 22. A photo film 24 from the photo film cassette 25 has a state wound in a roll form, which is disposed in the roll holder chamber 23. In the course of taking an exposure, the photo film 24 is moved into the photo film cassette 25 through the path. Lower lids 21a and 21b are included in the piece of the rear cover 21, and closes the lower openings of the cassette holder chamber 22 and the roll holder chamber 23. The lower lid 21a has an openably closed structure, and opened at the time of removing the photo film cassette 25 with the photo film 24 after being exposed.

The main body 19 includes the cassette holder chamber 22 and the roll holder chamber 23, and has the exposure unit 16 between those. The flash unit 17 is secured to the main body 19 by engagement of hooks between the exposure unit 16 and the roll holder chamber 23. The cassette holder chamber 22 is loaded with the photo film cassette 25. The roll holder chamber 23 is loaded with a photo film roll 24a formed by winding the photo film 24. The winder wheel 14 is disposed on the top of the cassette holder chamber 22 in a rotatable manner. A shaft portion projects from a lower face of the winder wheel 14, and is engaged with a spool in the photo film cassette 25 contained in the cassette holder chamber 22. When the winder wheel 14 is rotated in the counterclockwise direction, an exposed portion of the photo film 24 is moved into the photo film cassette 25.

The flash unit 17 is a combined unit including a control circuit board 30, the flash emitter 7, a main capacitor 31, a battery 32, a sync switch 33 and an aperture stop changing device 34. When the flash charger button 8 is slid up, a switch segment 35 at the control circuit board 30 is turned on to start charging the main capacitor 31. In a shutter mechanism, a shutter blade 36 includes a switching projection 36c. The sync switch 33 in the flash unit 17 is switched on by the switching projection 36c, so as to emit flash light. See FIG. 3. When the flash charger button 8 is slid up, a portion of the light guide 13 comes to protrude from the top of the housing 3.

The aperture stop changing device 34 includes a photometric switch 38, a transmission lever 39, a solenoid 40, a stopper lever 41 and the photometric unit 9. The transmission lever 39 and the stopper lever 41 constitute a transmission mechanism. A holder plate 42 for the aperture stop changing device 34 is disposed to support the photometric switch 38, the transmission lever 39, the solenoid 40 and the stopper lever 41 with the sync switch 33, and is secured to the control circuit board 30 as a combined unit.

Figure 3:
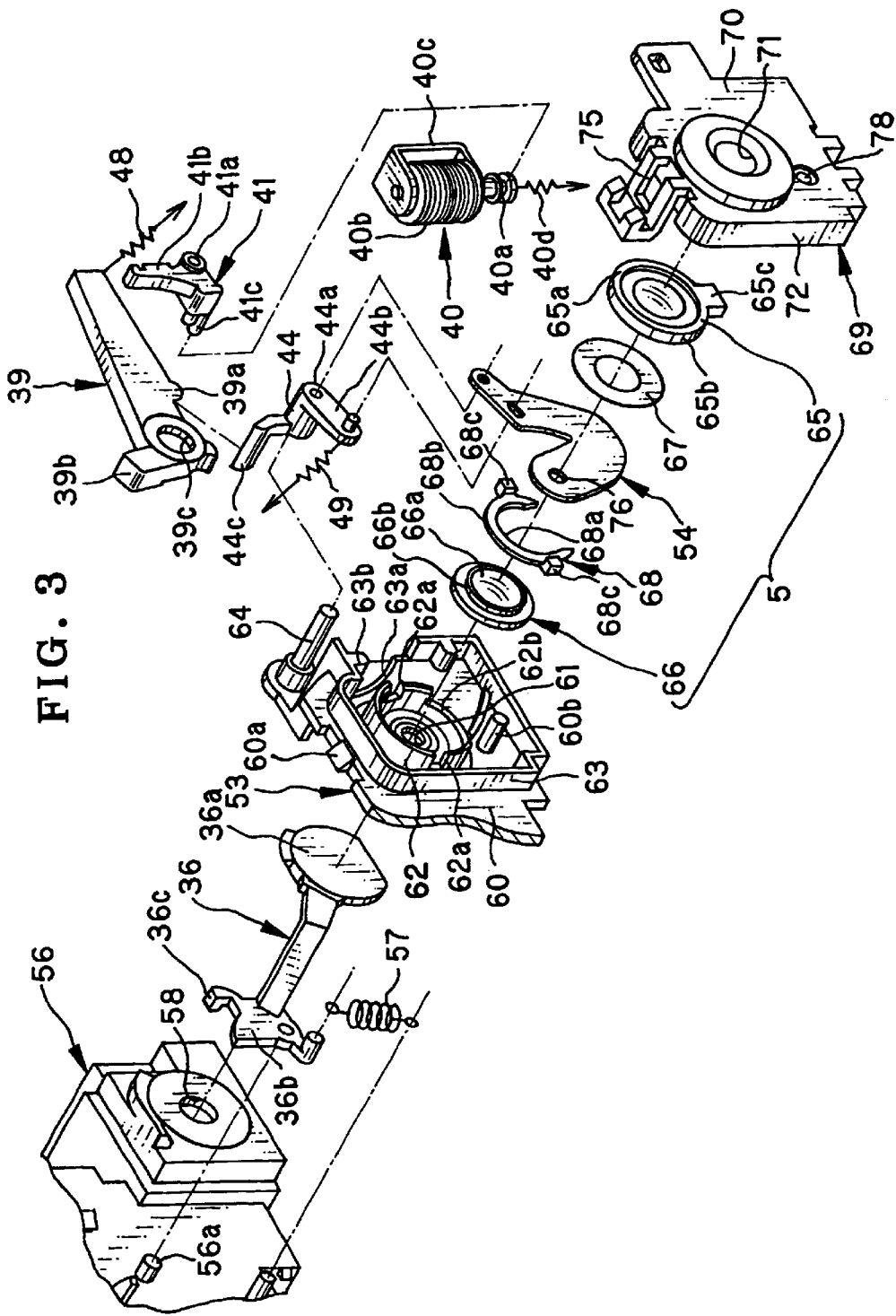
FIG. 3 is an exploded perspective illustrating a taking lens and an exposure unit together with an aperture stop changing mechanism.

In FIG. 3, the transmission lever 39 extends in a direction crosswise to an optical axis, and includes a driving end 39a, a retention end 39b and a pivotal hole 39c. The driving end 39a contacts an aperture changing lever 44. The retention end 39b becomes retained by a charge lever 45. See FIG. 5. A pivot 33a extends from the sync switch 33, and is inserted in the pivotal hole 39c rotatably. The transmission lever 39 is positioned with the sync switch 33 by this insertion. Also, the sync switch 33 is secured to the holder plate 42. A retention ring 47 is fitted on an end of the pivot 33a, and keeps the transmission lever 39 on the sync switch 33 without a drop. A bias coil spring 48 in the transmission mechanism is secured to the transmission lever 39, which is biased by the bias coil spring 48 in the clockwise direction to press the driving end 39a against the aperture changing lever 44. As will be described in detail, a bias coil spring 49 biases the aperture changing lever 44. The bias coil spring 48 has a stronger force of bias than the bias coil spring 49, and swings the aperture changing lever 44 against the force of the bias coil spring 49.

The stopper lever 41 is disposed under the transmission lever 39. The stopper lever 41 includes a pivotal hole 41a, a first end arm 41c and a second end arm 41b. The first end arm 41c extends in parallel with an axis of the pivotal hole 41a. The second end arm 41b projects upwards from the pivotal hole 41a. The solenoid 40 behind the stopper lever 41 has a plunger 40a, which is connected with the first end arm 41c in a rotatable manner. The holder plate 42 has a pin (not shown) inserted in the pivotal hole 41a of the stopper lever 41, which is kept rotatable by the pin. The connection of the first end arm 41c with the plunger 40a keeps the stopper lever 41 rotatable between first and second position. The second end arm 41b of the stopper lever 41, when in the first position, protrudes into a rotational orbit of the transmission lever 39, and when in the second position, comes out of the rotational orbit.

The solenoid 40 includes the plunger 40a, a winding 40b, a holder 40c and a spring 40d. The holder 40c is retained on a retention portion (not shown) formed in the holder plate 42, and is kept on the holder plate 42. The plunger 40a is slidable in the winding 40b, and is biased by the spring 40d down to protrude from the winding 40b. The solenoid 40 is such a type as to create a magnetic field to attract the plunger 40a when energized. Electric energy to the winding 40b is controlled by a control circuit according to a photometric value or brightness obtained by the photometric unit 9. If the photometric value of object light measured by the photometric unit 9 is smaller than a reference value or brightness, then the winding 40b is energized to retract the plunger 40a to an inner position inside the winding 40b.

The photometric unit 9 is constituted by a photoreceptor element 50, a photoreceptor case 51 and a protector 52. The photoreceptor case 51 contains the photoreceptor element 50 and is secured to the control circuit board 30. A photometric opening 51a opens in the photoreceptor case 51 to the front, and uncovers a portion of a photosensitive surface of the photoreceptor element 50 externally. The photoreceptor element 50 is connected with a circuit pattern in the control circuit board 30 by soldering. The solenoid 40 measures an amount of object light when turned on. The protector 52 is formed from transparent resin, is secured to the front of the photometric opening 51a, and protects the photoreceptor element 50 and the photoreceptor case 51.

The exposure unit 16 is disposed at the center of the main body 19. The control of the aperture stop is effected by a combination of a lens holder 53, an aperture changing plate 54, a shutter mechanism 55 and the aperture stop changing device 34. The exposure unit 16 includes a photo film retention mechanism, a frame counter mechanism, a viewfinder and the like. A light-shielding tunnel 56 is provided with the exposure unit 16 as a unified component. In front of the light-shielding tunnel 56, the shutter blade 36 and the lens holder 53 are mounted in this sequence.

In FIG. 3, the shutter blade 36 is constituted by a single blade in a sector shape. A pin 56a projects from the light-shielding tunnel 56 and supports the shutter blade 36 in a rotatable manner. A tension coil spring 57 biases the shutter blade 36. A blade portion 36a of the shutter blade 36 is kept by the tension coil spring 57 in a closed position to close a shutter opening 58. In taking an exposure, a shutter lever 59 is actuated upon depression of the shutter release button 11, to knock a driven end 36b of the shutter blade 36, which is rotated to an open position in the clockwise direction to open the shutter opening 58. After this, the shutter blade 36 is swung back to the closed position by the tension coil spring 57. The back and forth swing of the shutter blade 36 provides an exposure by opening and closing the shutter opening 58. The switching projection 36c is formed with the shutter blade 36 for pushing the sync switch 33 at the flash unit 17. When the shutter blade 36 comes to an open position to open the shutter opening 58 fully, the switching projection 36c switches on the sync switch 33.

The lens holder 53 includes a holder plate 60, a preset open aperture 61, a holder barrel portion 62, a frame-shaped ridge 63 and a support pin 64. The holder plate 60 covers a front of the light-shielding tunnel 56. The preset open aperture 61 is disposed at the center of the holder plate 60, and defines a larger aperture stop that is an open aperture. The holder barrel portion 62 has a cylindrical shape. The frame-shaped ridge 63 is disposed about the holder barrel portion 62. The support pin 64 projects from the holder plate 60, and supports the aperture changing lever 44 in a rotatable manner. The taking lens 5 is constituted by a front lens element 65 and a rear lens element 66. The front lens element 65 has a greater diameter, and has a front convex surface. The rear lens element 66 has a smaller diameter, and has a rear convex surface.

Figure 4:
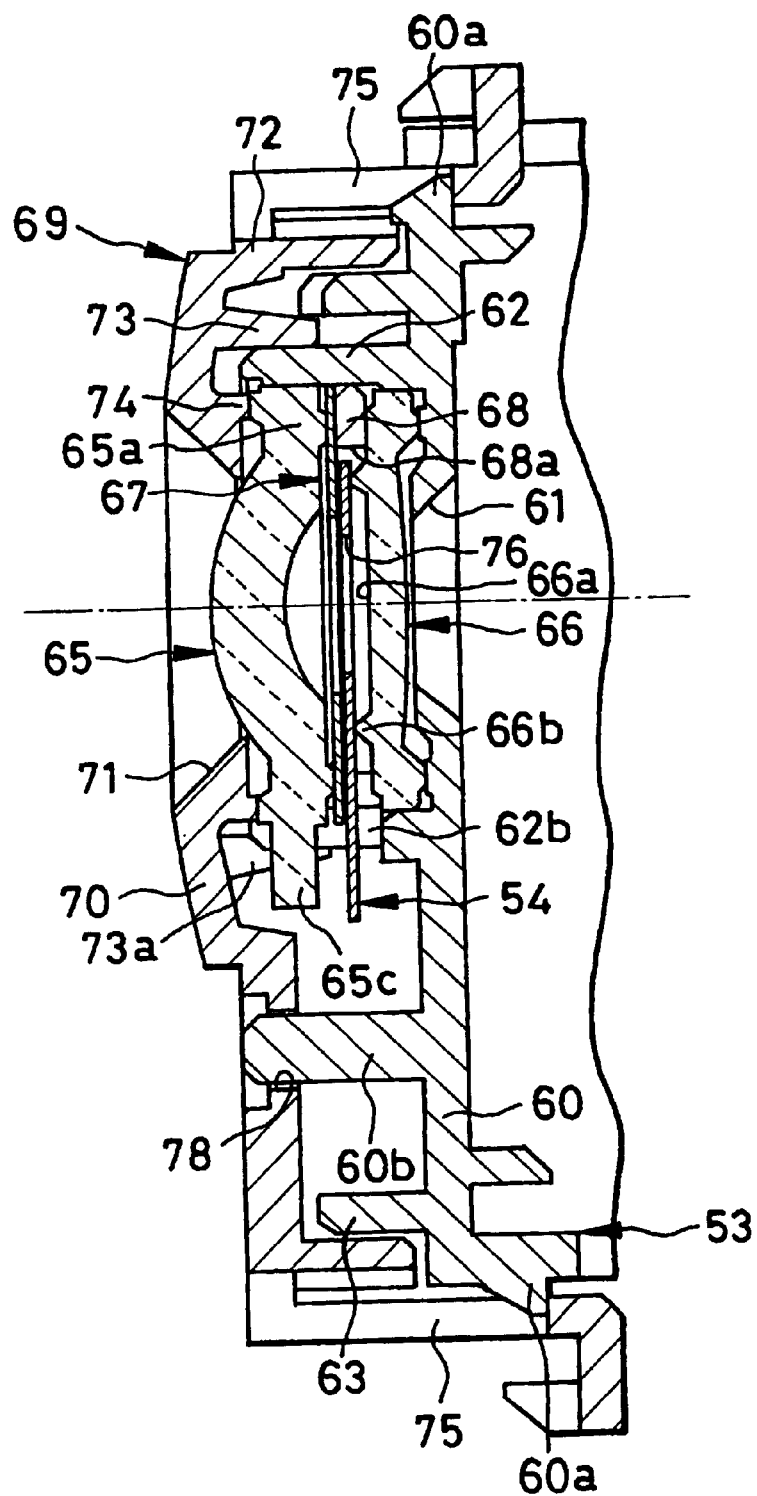
FIG. 4 is a cross section illustrating the taking lens, the aperture stop changing mechanism, and various elements relevant thereto.

In FIG. 4, the holder barrel portion 62 supports the front lens element 65, a flare stopper 67, a spacer 68 and the rear lens element 66 arranged in sequence from the objective side toward the photo film on the optical axis. The spacer 68 has a U shape, is sandwiched with the flare stopper 67 between the front and rear lens elements 65 and 66, for positioning those at an unchanged distance. The aperture changing plate 54 swings to pass the gap defined between the front and rear edges of the spacer 68.

A retention plate 69 is fitted on a front of the lens holder 53. The retention plate 69 includes a front wall 70, a lens opening 71, a frame-shaped ridge 72, a ring-shaped outer ridge 73, a ring-shaped first positioning ridge 74, a retention hole 75 and an engagement hole 78. The front wall 70 is disposed in front of the taking lens 5. The lens opening 71 is formed in the front wall 70, and uncovers an effective portion of the taking lens 5. The frame-shaped ridge 72 extends from the front wall 70, and has a quadrilateral shape covering a contour of the frame-shaped ridge 63. The ring-shaped outer ridge 73 is disposed inside the front wall 70 and has an inner diameter corresponding to an outer diameter of the holder barrel portion 62. The first positioning ridge 74 is formed inside the front wall 70 and disposed within the ring-shaped outer ridge 73. A retention hook 60a projects from each of upper and lower edges of the holder plate 60. The retention hole 75 receives insertion of the retention hook 60a. A pin 60b projects from the holder plate 60, and is received in the engagement hole 78.

Figure 5:
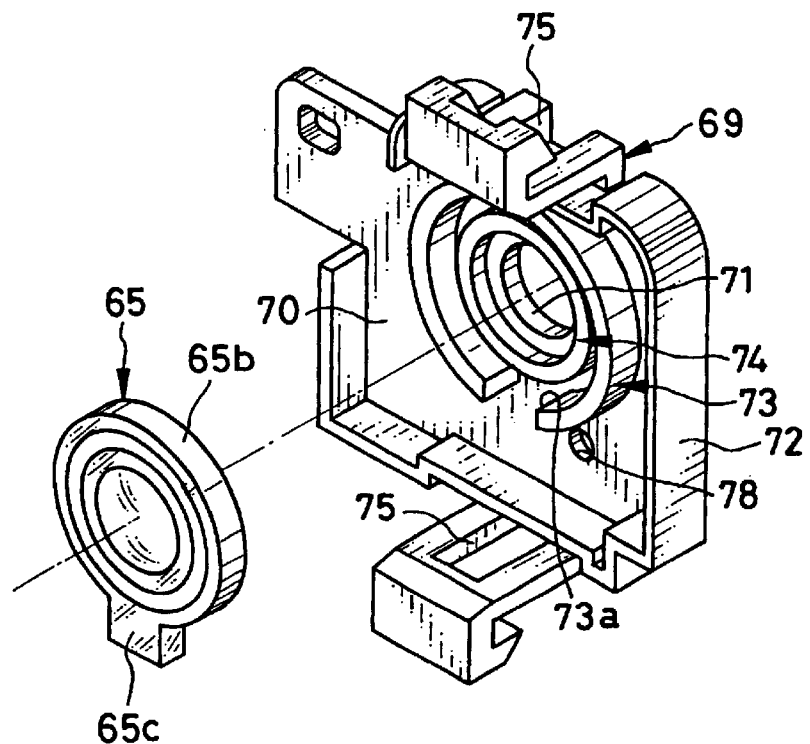
FIG. 5 is an exploded perspective illustrating a front lens element and a retention plate.

In FIG. 5, the ring-shaped outer ridge 73 and the first positioning ridge 74 are depicted in detail, and protrude in the optical axis direction towards the taking lens 5 in positions of the holder barrel portion 62. The front lens element 65 has a peripheral portion 65a with a ring-shaped second positioning ridge, to which the first positioning ridge 74 is opposed, and has a larger size than the lens opening 71. In FIG. 4, the first positioning ridge 74 pushes the peripheral portion 65a. The taking lens 5 is kept fixed between the retention plate 69 and the lens holder 53 together with the flare stopper 67 and the spacer 68. In a conventional type of retention plate, plural projections are formed near to the lens opening 71 for retaining a taking lens. However, there is a problem in that dust, sand or other foreign matter is likely to enter the lens opening 71 and comes in the camera through gaps between those projections. However, such a problem can be avoided according to the present invention, because the first positioning ridge 74 of the retention plate 69 presses the front lens element 65 very tightly to minimize the space between those.

In the retention plate 69, the retention hole 75 is retained by the retention hook 60a. The engagement hole 78 is engaged with the pin 60b. So the retention plate 69 is secured to the lens holder 53, to fit the frame-shaped ridge 72 outside the frame-shaped ridge 63. Consequently, the inside of the lens holder 53 is enclosed. Also, the front end of the holder barrel portion 62 is engaged with the ring-shaped outer ridge 73, to position the center of the taking lens 5 and the lens opening 71 exactly to one another.

The spacer 68 includes an inner gap 68a, a peripheral edge 68b and retention projections 68c. The inner gap 68a is so shaped as to correspond to the contour of the end of the aperture changing plate 54. The peripheral edge 68b has an outer diameter determined according to the inner surface of the holder barrel portion 62. Retention notches 62a are formed in the holder barrel portion 62, and receive insertion of the retention projections 68c. The retention projections 68c protrude from the peripheral edge 68b in two positions. The retention projections 68c are inserted in the retention notches 62a of the holder barrel portion 62 to keep the spacer 68 positioned without offsetting rotationally about the optical axis. A passage cutout 62b and a cutout 63a are formed in respectively the holder barrel portion 62 and the frame-shaped ridge 63. The aperture changing plate 54 comes into the cutout 63a of the frame-shaped ridge 63. A greater portion of the aperture changing plate 54 is disposed in the inside of the lens holder 53. Furthermore, an end of the aperture changing plate 54 comes through the passage cutout 62b into the holder barrel portion 62, to change over the aperture stop.

The flare stopper 67 blocks rays traveling outside a photographic light path, to suppress occurrence of flare. Also, the flare stopper 67 contacts a front face of the aperture changing plate 54 entering the holder barrel portion 62 through the passage cutout 62b. Therefore, the aperture changing plate 54 is suitably positioned in the optical axis direction.

The front lens element 65 includes a peripheral edge 65b and a retention projection 65c protruding from the peripheral edge 65b radially. The retention projection 65c is fitted in the passage cutout 62b in the holder barrel portion 62, to keep the front lens element 65 from rotating about the optical axis. Note that the front lens element 65 can be kept fastened in a different manner. For example, a retention cutout 73a formed in the ring-shaped outer ridge 73 may be utilized as illustrated in FIG. 5 to position the front lens element 65 by retaining the retention protection 65c. The retention cutout 73a can have a position and size determined to correspond to the retention projection 65c.

Figure 6:
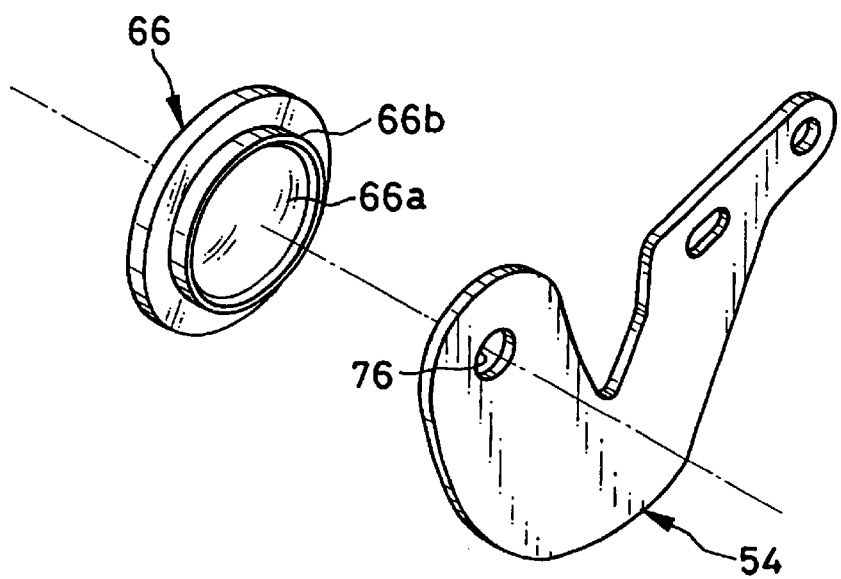
FIG. 6 is an exploded perspective illustrating a rear lens element and an aperture changing plate.

In FIG. 6, the rear lens element 66 has a front surface 66a. A ring-shaped guide projection portion 66b projects from the front surface 66a in the optical axis direction at a regular height. The guide projection portion 66b contacts a rear surface of the aperture changing plate 54 entering the holder barrel portion 62 through the passage cutout 62b. Thus, the position of the aperture changing plate 54 is regulated in the optical axis direction. As the front surface of the aperture changing plate 54 frictionally contacts the flare stopper 67, the aperture changing plate 54 moves between the guide projection portion 66b and the flare stopper 67. The guide projection portion 66b has such a position and diameter as to lie outside the light path restricted by the flare stopper 67. Furthermore, the spacer 68 is so positioned about the guide projection portion 66b that the guide projection portion 66b lies inside the inner gap 68a. A thickness of the spacer 68 is greater than a height of the guide projection portion 66b, to keep a sufficient space for contact between the guide projection portion 66b and the aperture changing plate 54 inside the inner gap 68a.

The aperture changing plate 54 has generally an L shape. A stop-down opening 76 is formed in the aperture changing plate 54, and has a diameter smaller the preset open aperture 61 in the lens holder 53. The end portion of the aperture changing plate 54 is moved into the space between the front and rear lens elements 65 and 66 under the spacer 68.

The aperture changing lever 44 includes a pivot 44a, a connection arm 44b and a driven end arm 44c. A through hole (not shown) is formed through the pivot 44a in the aperture changing lever 44, and receives insertion of the support pin 64 of the lens holder 53, where the support pin 64 is supported rotatably. The aperture changing plate 54 is fixed on the connection arm 44b. The driven end arm 44c extends upwards from the rear of the pivot 44a, and contacts the transmission lever 39 described above. The bias coil spring 49 is connected to the aperture changing lever 44. The bias of the bias coil spring 49 causes the aperture changing plate 54 with the aperture changing lever 44 to rotate clockwise. An end of the aperture changing plate 54 comes into a passage gap or cutout defined by the spacer 68. A stopper portion 63b is formed to project from the frame-shaped ridge 63. Upon rotation of the aperture changing lever 44 caused by the bias coil spring 49, an upper edge of the connection arm 44b is received by the stopper portion 63b. See FIG. 8. Thus, the aperture changing plate 54 is positioned to dispose the stop-down opening 76 exactly at the optical axis. Note that a portion other than the stopper portion 63b of the frame-shaped ridge 63 may position the aperture changing plate 54. For example, any one of the members close to the aperture changing lever 44 may position the aperture changing plate 54 as a portion projecting into a rotational path of the aperture changing lever 44. Also, the aperture changing plate 54 and the aperture changing lever 44 may be one piece as a combined member, so the aperture changing plate 54 can be received by the stopper portion 63b itself.

Note that it is possible not to form the stopper portion 63b, but to construct the spacer 68 to receive the aperture changing plate 54 with the aperture changing lever 44 in place of the stopper portion 63b.

The aperture changing plate 54 is controlled for movement by turning on and off the winding 40b of the solenoid 40, as described hereinafter. When no heat energy is supplied to the winding 40b, the plunger 40a is set by the spring 40d in a position protruding down from the winding 40b. The stopper lever 41 secured to the plunger 40a is in the rotation preventing position to prevent the transmission lever 39 from rotating. The transmission lever 39, when stopped by the stopper lever 41, discontinues being biased by the bias coil spring 48. The driving end 39a does not push the aperture changing lever 44. In this state, the aperture changing plate 54 is kept by the bias coil spring 49 in a small diameter position where the stop-down opening 76 is set on the optical axis.

While the winding 40b is energized, the plunger 40a is in an upper position with attracting force of the winding 40b. The stopper lever 41 rotates toward a rotation releasing position according to movement of the plunger 40a. The transmission lever 39 is set ready for rotation by the shift of the stopper lever 41, and caused by the bias coil spring 48 to push the aperture changing lever 44. The aperture changing plate 54 biased by means of the transmission lever 39 rotates from the small diameter position to a large diameter position, where the stop-down opening 76 is away from the photographic light path. In short, the solenoid 40 is an actuator or prime mover for rotating the stopper lever 41. Note that, even when the aperture changing plate 54 is in the large diameter position, an end of the aperture changing plate 54 is located to overlap on the shape of the flare stopper 67. In other words, the flare stopper 67 is so shaped to cover all the locus of the aperture changing plate 54 being moved. The flare stopper 67 is effective in guiding the aperture changing plate 54 in a plane crosswise to the optical axis direction. Therefore, the aperture changing plate 54 can move smoothly without interference of the lens holder 53, the retention plate 69 or other elements close thereto.

Figure 7:
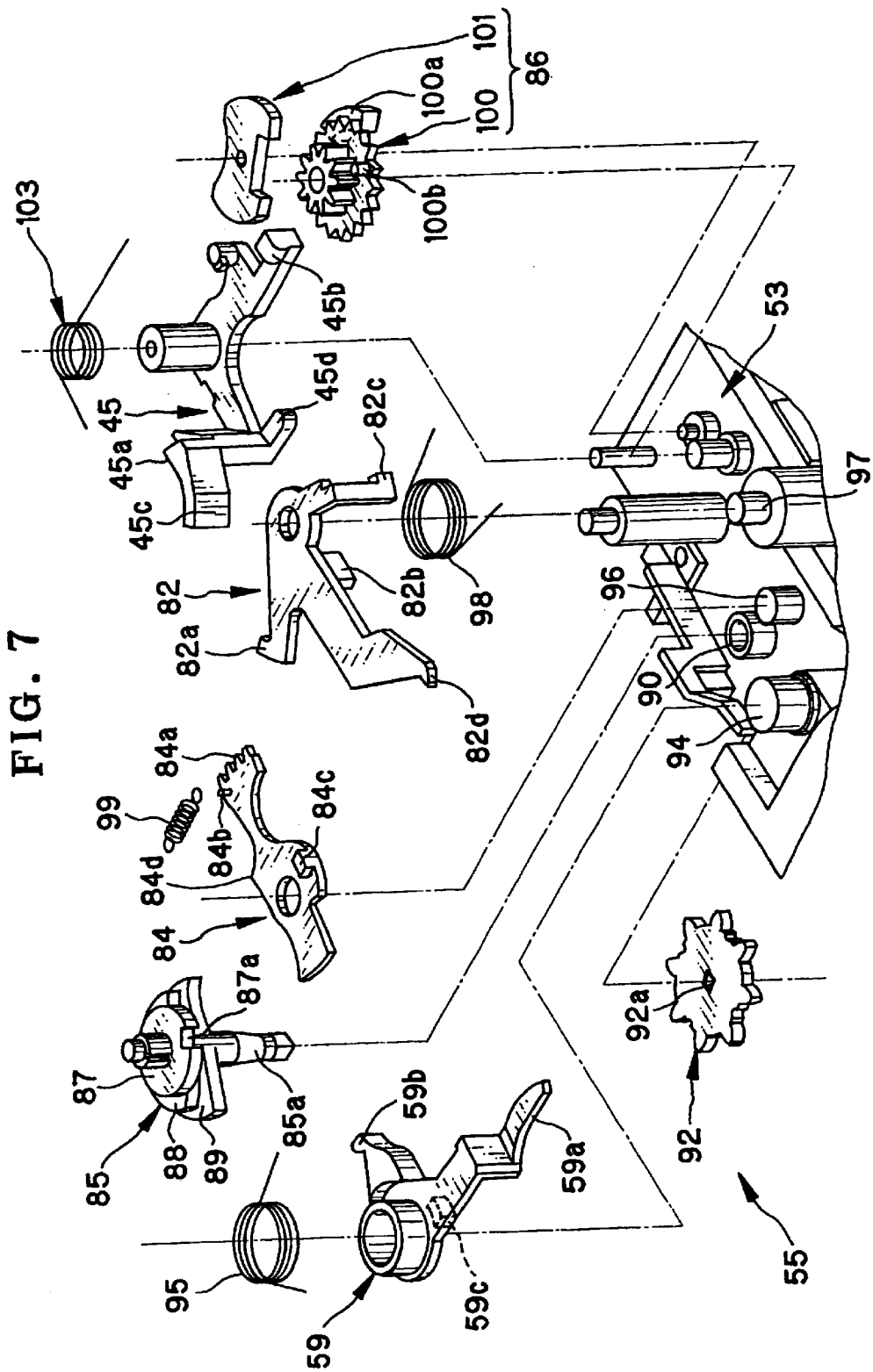
FIG. 7 is an exploded perspective illustrating a shutter mechanism.

In FIG. 7, the shutter mechanism 55 is secured to the top of the light-shielding tunnel 56. The shutter mechanism 55 includes a retention lever 82, the shutter lever 59, a delay lever 84, the charge lever 45, a cam 85 and a governor mechanism 86. The cam 85 includes a disk 87, a first cam element 88 and a second cam element 89. Each of the first and second cam elements 88 and 89 has a shape of a semicircle. A notch 87a is formed in the disk 87. A retention end 82a of the retention lever 82 is locked by the notch 87a.

A hook 59b of the shutter lever 59 contacts the peripheral surface of the first cam element 88. The second cam element 89 is disposed with a predetermined relation to the first cam element 88. A shoulder 84d of the delay lever 84 contacts the second cam element 89. A boss 90 is formed with the light-shielding tunnel 56, and has a hole in which the cam 85 is inserted. A pivot 85a of the cam 85 has a key at a lower end. A key way 92a in a sprocket wheel 92 is engaged with the key of the pivot 85a. In moving the photo film 24 into the photo film cassette 25, the sprocket wheel 92 is meshed with perforations in the photo film 24, and is caused to rotate in the counterclockwise direction. Also, the cam 85 is rotated together. A counter wheel in the frame counter rotates to indicate the number of available frames.

A pin 94 is formed with the light-shielding tunnel 56, and supports the shutter lever 59 in a rotatable manner. The shutter opening 58 includes a knocking arm 59a, the hook 59b and a projection 59c. The knocking arm 59a knocks an end of the shutter blade 36. The hook 59b contacts the first cam element 88 of the cam 85. The projection 59c is retained by the delay lever 84. A torsion coil spring 95 is disposed on the top of the shutter lever 59, and biases the shutter lever 59 in the counterclockwise direction.

The retention lever 82 includes the retention end 82a, a projection 82b, a release arm 82c and a retention arm 82d. A pivot 97 projects from the light-shielding tunnel 56, and supports the retention lever 82 in a rotatable manner. A torsion coil spring 98 is provided and biases the retention lever 82 in the clockwise direction. A retention projection 84c protrudes from the delay lever 84. The projection 82b of the retention lever 82 is so disposed as to contact the retention projection 84c. The retention end 82a is disposed to enter the notch 87a formed in the cam 85. A number of teeth 14a are formed in the periphery of the winder wheel 14. When the retention lever 82 rotates in the clockwise direction, the retention arm 82d becomes engaged with the teeth 14a, and blocks rotation of the winder wheel 14. A press arm 11a protrudes down from a lower face of the shutter release button 11. When the shutter release button 11 is depressed, the release arm 82c is pushed by the press arm 11a, and rotates in the counterclockwise direction.

A pivot 96 projects from the light-shielding tunnel 56, and supports the delay lever 84 in a rotatable manner. The delay lever 84 is combined with the governor mechanism 86 to constitute a delay mechanism. A tooth train 84a is formed with the delay lever 84, and is meshed with a switching gear 100 of the governor mechanism 86. A pin 84b projects from the delay lever 84 and is disposed close to the tooth train 84a. A tension coil spring 99 is fastened to the pin 84b, and biases the delay lever 84 in the counterclockwise direction. The retention projection 84c is formed with the delay lever 84. The projection 82b of the retention lever 82 is retained by the retention projection 84c. Also, the shoulder 84d contacts the second cam element 89 of the cam 85.

An ankle 101 and the switching gear 100 are included in the governor mechanism 86, and are disposed on the top of the light-shielding tunnel 56. The rotational speed of the switching gear 100 is adjusted by the ankle 101. As described heretofore, the switching gear 100 is meshed with the tooth train 84a of the delay lever 84, and is driven by rotation of the delay lever 84. Therefore, the governor mechanism 86 operates for adjusting a rotational speed of the delay lever 84. In FIG. 7, a press ridge 100a in a sector shape protrudes from a lower side of the switching gear 100. The rotation of the press ridge 100a causes the charge lever 45 to rotate in the clockwise direction. A pin 100b protrudes from an upper side of the switching gear 100, and rotates to contact the photometric switch 38 and turn on the same. The governor mechanism 86 is effective in delaying the knocking of the shutter opening 58 to the shutter blade 36. The photometric unit 9 is operated for photometry during the period of the delay, to change over the aperture changing plate 54.

The charge lever 45 has substantially an L shape, and includes an arm 45a and a retention projection 45b. A torsion coil spring 103 is secured to the charge lever 45, and biases the charge lever 45 in the counter clockwise direction. The arm 45a projects upwards from the charge lever 45, and includes a contact surface 45c and a driven end 45d, the driven end 45d being a lower end. The contact surface 45c is disposed to contact a side of the switching gear 100. The charge lever 45 is biased by the torsion coil spring 103 as described above. When the contact surface 45c contacts the switching gear 100, the rotation is stopped. The driven end 45d is pushed by the press ridge 100a of the switching gear 100, and causes the charge lever 45 to rotate clockwise against the torsion coil spring 103. The retention projection 45b retains the retention end 39b of the transmission lever 39, and keeps the transmission lever 39 fixed.

Note that the construction of the shutter mechanism, the delay lever and the governor mechanism used in the present embodiment is the same as that disclosed in the co-pending U.S. patent application Ser. No. 09/699,465 (corresponding to EP-A 1 096 308).

Figure 8:
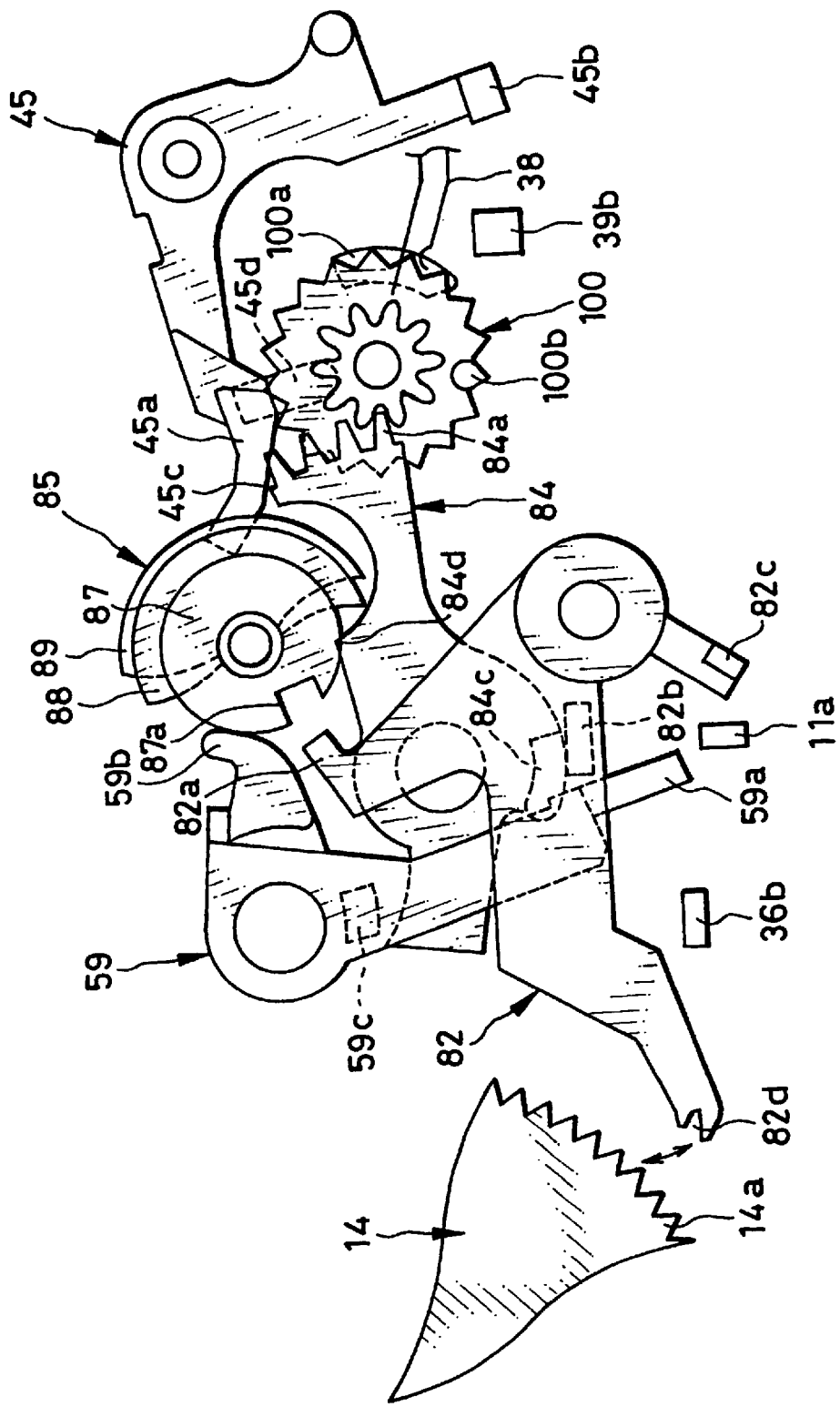
FIG. 8 is a plan illustrating the shutter mechanism in a released state.
Figure 9:
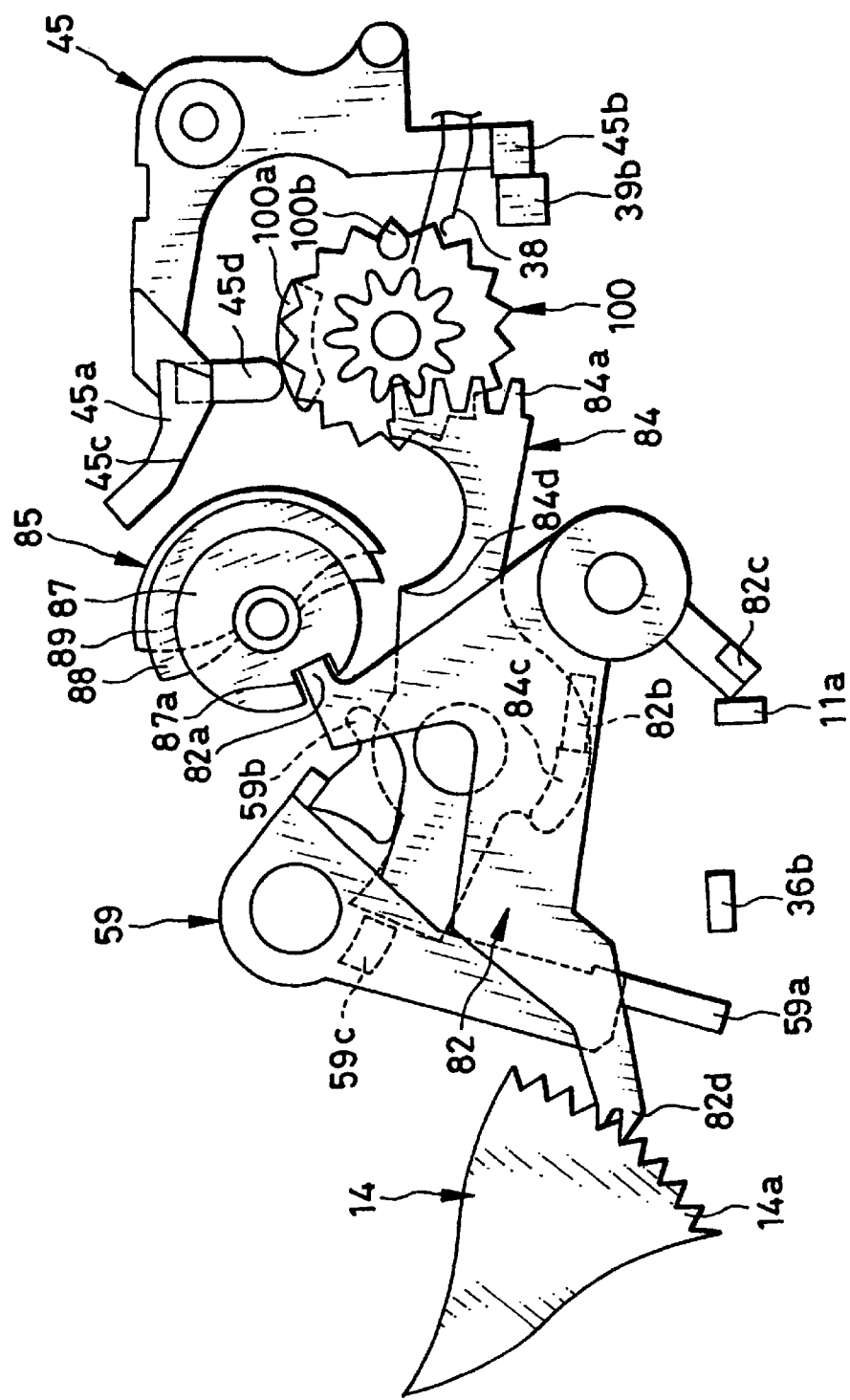
FIG. 9 is a plan illustrating the shutter mechanism in a charged state.

The operation of the above embodiment is described now. In FIG. 8, the shutter mechanism is depicted in a state immediately after the shutter releasing. In FIGS. 8 and 9, the depiction of the construction is simplified for understanding by eliminating the ankle 101 in the governor mechanism 86, the various springs and the like. The retention lever 82 is biased by the torsion coil spring 98 in the clockwise direction. As the projection 82b contacts the retention projection 84c of the delay lever 84, the retention lever 82 is kept in its home position where the retention arm 82d is disengaged from the teeth 14a in the periphery of the winder wheel 14. The contact surface 45c of the charge lever 45, which is biased by the torsion coil spring 103, contacts the switching gear 100 and is kept from rotating. The retention projection 45b of the charge lever 45 is in a position away from the retention end 39b of the transmission lever 39.

When the cam 85 is rotated by winding of the photo film 24, the second cam element 89 pushes the shoulder 84d of the delay lever 84. Thus, the delay lever 84 starts a clockwise rotation. In FIG. 9, the delay lever 84 rotates by a predetermined amount, before the projection 82b of the retention lever 82 is disengaged from the retention projection 84c. The retention lever 82, in turn, rotates clockwise by a predetermined amount. Then a portion of the photo film 24 becomes moved by one frame winding. The retention end 82a enters the notch 87a formed in the disk 87. At the same time, the retention arm 82d comes in mesh with the teeth 14a formed in the winder wheel 14, and blocks rotation of the winder wheel 14. The delay lever 84 is biased by the tension coil spring 99 rotationally in the counterclockwise direction. However, retention between the projection 82b of the retention lever 82 and the retention projection 84c of the delay lever 84 blocks rotation of the delay lever 84.

Figure 10:
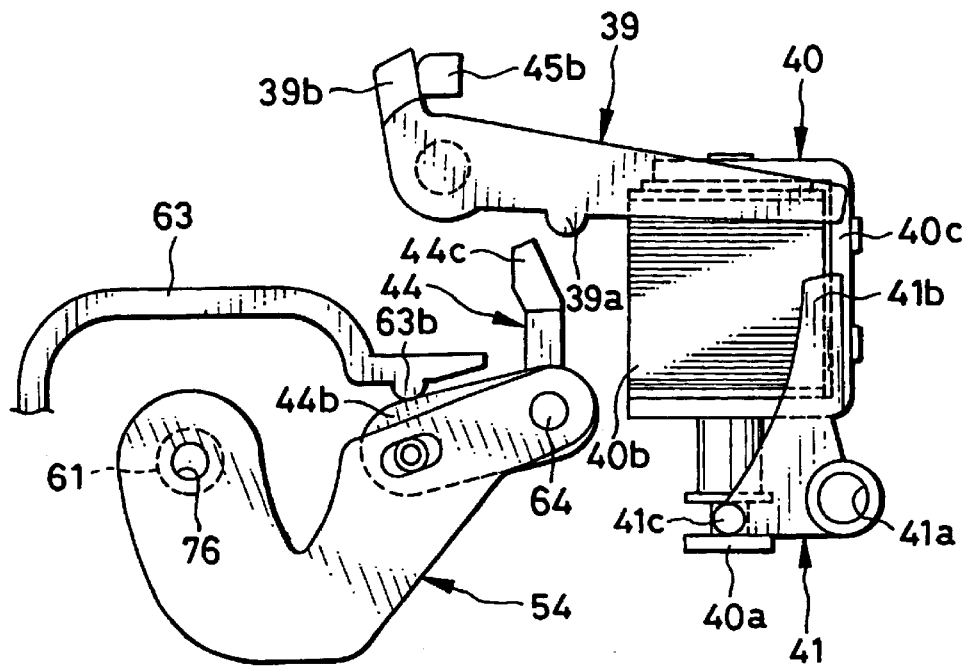
FIG. 10 is an explanatory view in front elevation, illustrating an aperture stop changing mechanism in a state where a charge lever is charged.

When the delay lever 84 rotates counterclockwise, the switching gear 100 starts rotation together in the counterclockwise direction. When the switching gear 100 rotates by a predetermined angle, then the press ridge 100a pushes the driven end 45d of the charge lever 45, to rotate the charge lever 45 in the clockwise direction. When the shutter mechanism is in the charged state of FIG. 7, the driven end 45d contacts the press ridge 100a to keep the charge lever 45 stopped. The retention projection 45b of the charge lever 45 retains the retention end 39b of the transmission lever 39, to keep the transmission lever 39 stopped rotationally. The transmission lever 39 retained by the retention projection 45b of the charge lever 45 is in a position away from the aperture changing lever 44. See FIG. 10. The aperture changing plate 54 is biased by the bias coil spring 49 but not by the transmission lever 39. The connection arm 44b of the aperture changing lever 44 contacts the stopper portion 63b of the frame-shaped ridge 63. The stop-down opening 76 is in the small diameter position at the photographic light path.

When the shutter release button 11 is depressed in a charged state of the shutter, the press arm 11a of the shutter release button 11 pushes the release arm 82c of the retention lever 82. Thus, the retention lever 82 rotates counterclockwise against the torsion coil spring 98. The retention projection 84c of the delay lever 84 is disengaged from the projection 82b. The delay lever 84 is caused by the tension coil spring 99 to rotate counterclockwise. This rotation causes the ankle 101 of the governor mechanism 86 to rotate. The pin 100b switches on the photometric switch 38 to effect photometry of object light in the photometric unit 9. A photometric value or brightness is obtained by the photometric unit 9, to determine turning on or off of the solenoid 40.

Figure 11:
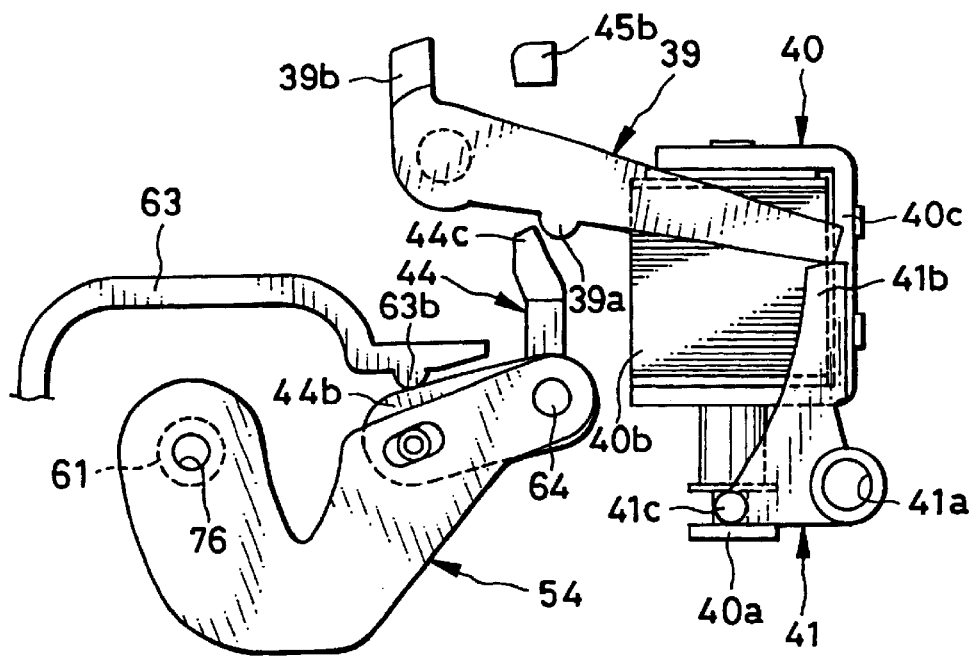
FIG. 11 is an explanatory view in front elevation, illustrating the same as FIG. 10 but in a state where high brightness is detected.

When the delay lever 84 rotates counterclockwise, the press ridge 100a comes out of the rotational orbit of the driven end 45d of the charge lever 45. The torsion coil spring 103 causes the charge lever 45 in the counterclockwise direction. The retention projection 45b of the charge lever 45 is released from the retention of the retention end 39b. Thus the transmission lever 39 is caused by the bias coil spring 48 to rotate clockwise. If the photometric value measured by the photometric unit 9 is higher than the reference value or brightness, the stopper lever 41 is in the rotation preventing position, as the solenoid 40 is not energized. The transmission lever 39, released from the retention of the retention projection 45b, makes a clockwise rotation to a small extent, and then is stopped from rotating by the stopper lever 41. See FIG. 11. The transmission lever 39 being stopped does not push the aperture changing lever 44. The aperture changing plate 54 remains in the small diameter position.

Figure 12:
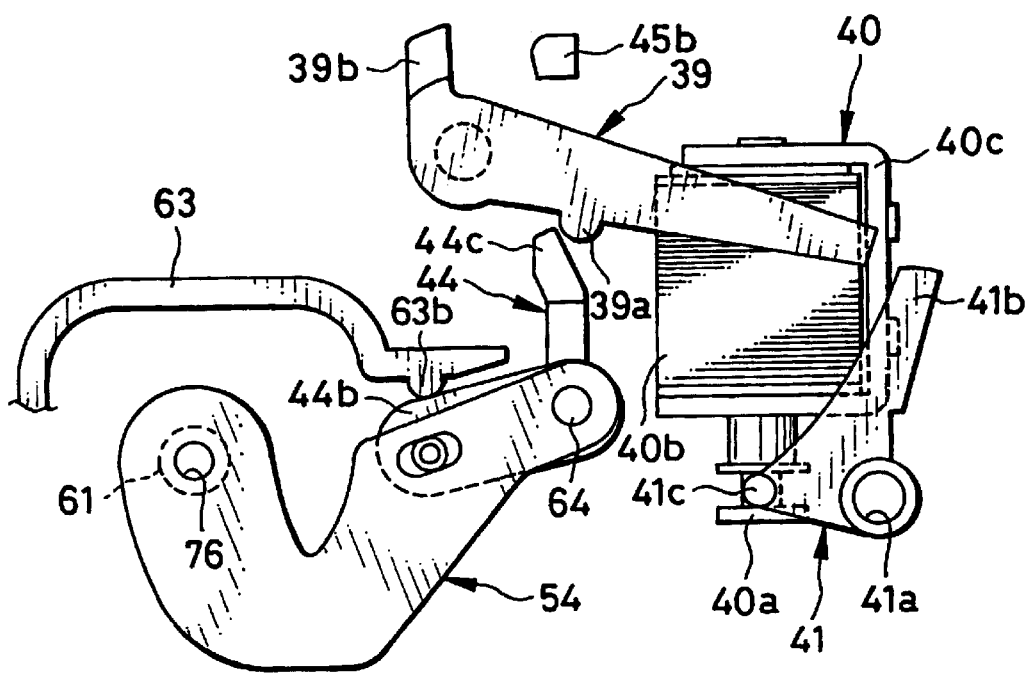
FIG. 12 is an explanatory view in front elevation, illustrating the same as FIG. 10 but in a state where low brightness is detected.
Figure 13:
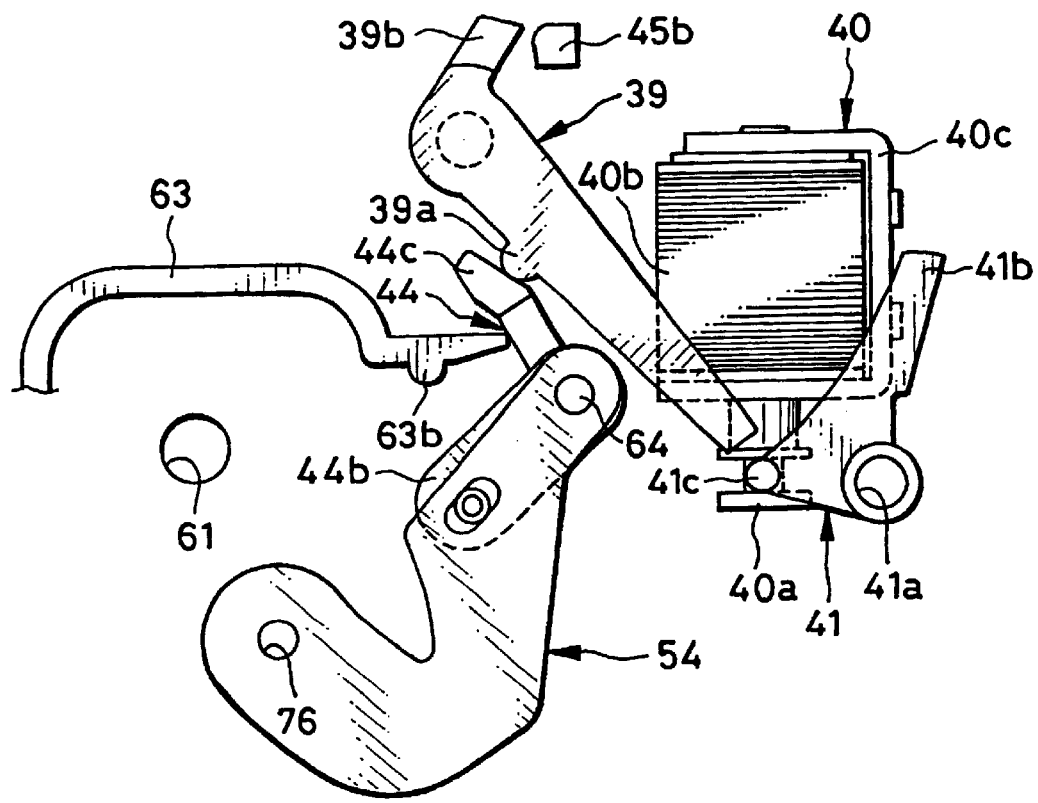
FIG. 13 is an explanatory view in front elevation, illustrating the aperture stop changing mechanism at the time of an exposure immediately after FIG. 12.

If the photometric value is smaller than the reference value, then the solenoid 40 is energized. In FIG. 12, the stopper lever 41 is caused to rotate from the rotation preventing position to the rotation releasing position. The transmission lever 39 disengaged from the stopper lever 41 pushes the aperture changing lever 44, and causes the aperture changing plate 54 to swing from the small diameter position to the large diameter position. See FIG. 13. The rear surface of the aperture changing plate 54 frictionally contacts the guide projection portion 66b of the rear lens element 66. Also, the flare stopper 67 is opposed to the front surface of the aperture changing plate 54. Both surfaces or the aperture changing plate 54 are regulated in the position relative to the optical axis. The end portion of the aperture changing plate 54 can move between the small and large diameter positions. The front surface 66a of the rear lens element 66 can be prevented from being scratched.

After the aperture changing plate 54 is changed over, an end of the delay lever 84 associated with the governor mechanism 86 is released from the retention on the projection 59c of the shutter lever 59. The shutter lever 59 is caused to rotate counterclockwise, for the knocking arm 59a to knock the shutter blade 36. The photo film 24 is exposed to create a frame in a state with the aperture changing plate 54 kept in the large or small diameter position. If the aperture changing plate 54 is in the small diameter position, the connection arm 44b of the aperture changing lever 44 contacts the stopper portion 63b of the frame-shaped ridge 63, to position the stop-down opening 76 at the photographic light path. Also, the front lens element 65 is positioned by fitting in the passage cutout 62b of the holder barrel portion 62. The ring-shaped outer ridge 73 of the retention plate 69 is positioned with the holder barrel portion 62. Therefore, the stop-down opening 76 can be correctly set at the optical axis of the taking lens 5, to take an exposure in an optimized state.

In the above embodiment, the taking lens includes the two lens elements. However, a taking lens according to the present invention may include one lens element, or three or more lens elements. Another preferred embodiment having a single lens is described hereinafter. Elements similar to those of the above embodiment are designated with identical reference numerals.

Figure 14:
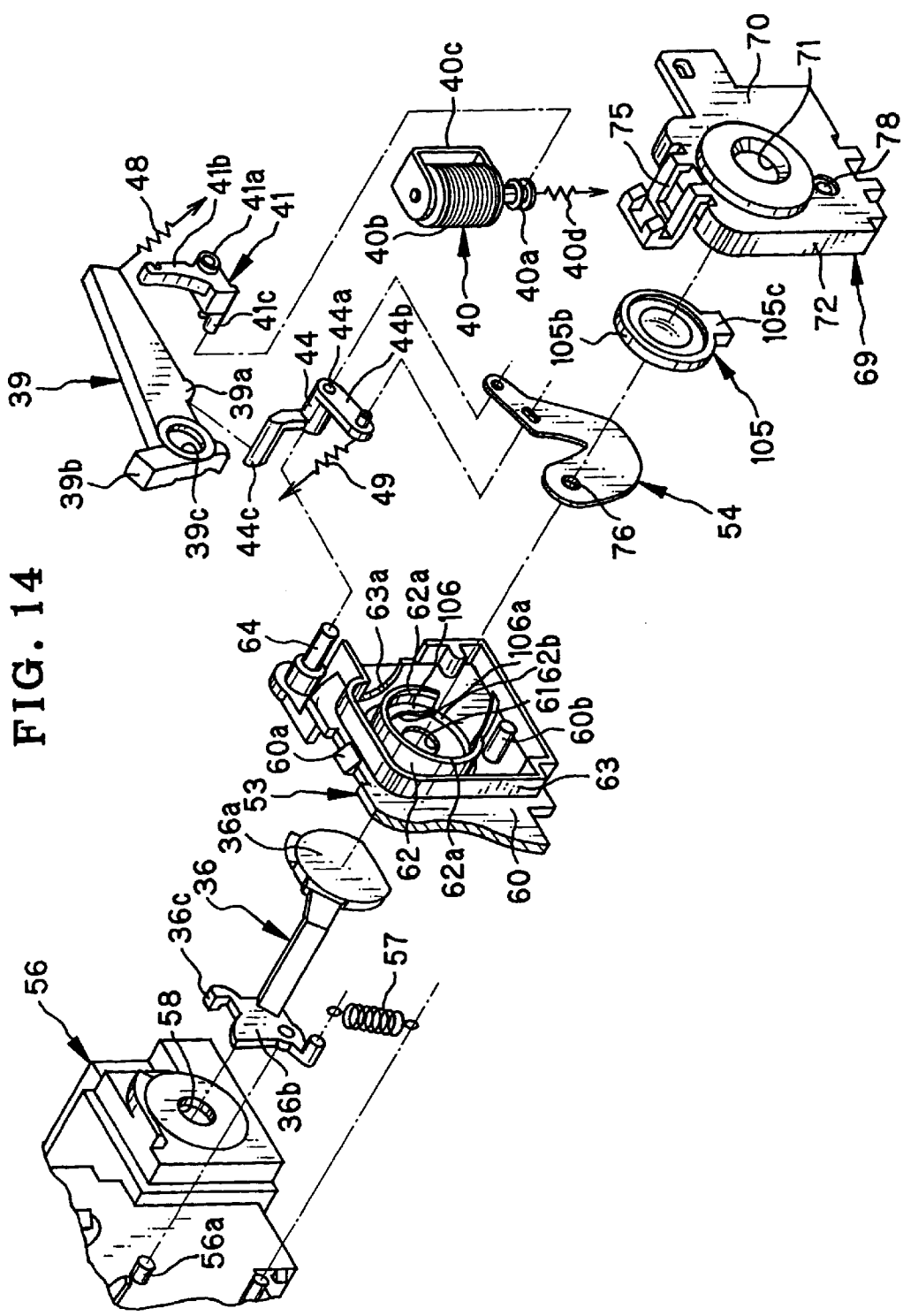
FIG. 14 is an exploded perspective illustrating another preferred embodiment having a single lens element as a taking lens.
Figure 15:
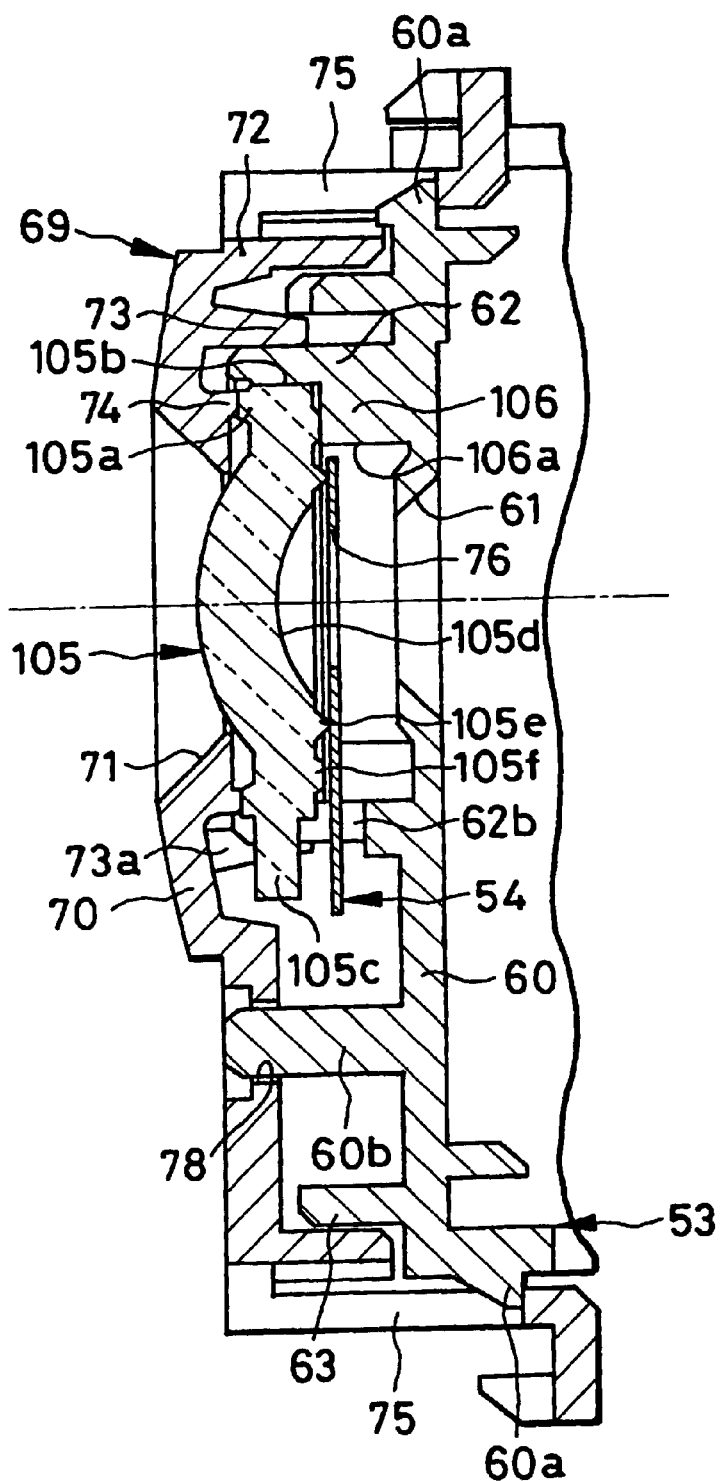
FIG. 15 is a cross section illustrating the taking lens, an aperture stop changing mechanism, and various elements relevant thereto.

In FIGS. 14 and 15, a taking lens 105 of the embodiment includes a single lens element. In the present embodiment, a spacer projection or ridge 106 is formed integrally with the holder barrel portion 62. An inner gap 106a is defined inside the spacer projection 106. An end of the aperture changing plate 54 is moved into and out of the inner gap 106a of the spacer projection 106, to change the aperture stop.

A peripheral portion 105a with a ring-shaped second positioning ridge of the taking lens 105 is pushed by the first positioning ridge 74 of the retention plate 69, to squeeze the taking lens 105 between the retention plate 69 and the lens holder 53. The taking lens 105 includes a peripheral edge 105b and a retention projection 105c projecting from the taking lens 105 radially. The retention projection 105c is fitted in the retention cutout 73a formed in the ring-shaped outer ridge 73, and keeps the taking lens 105 fastened without moving rotationally.

Figure 16:
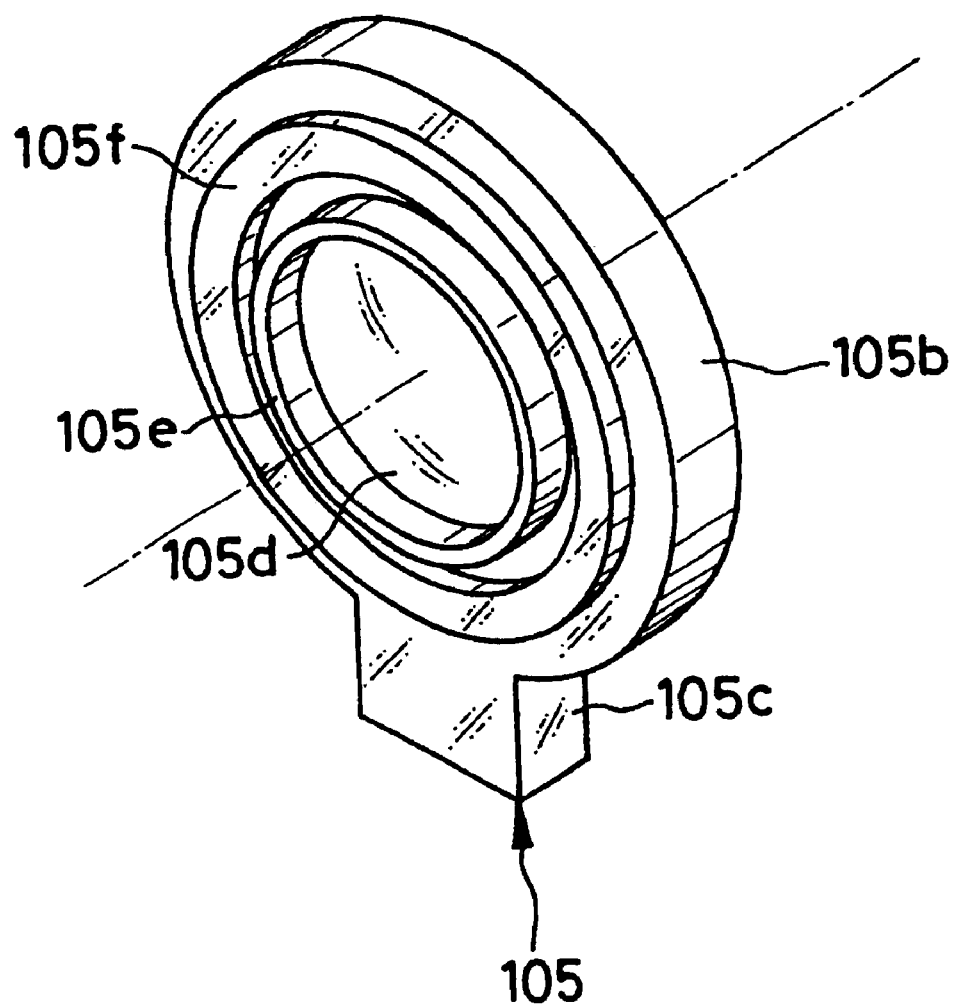
FIG. 16 is a perspective illustrating the taking lens.

In FIG. 16, the taking lens 105 includes a rear surface 105d, a guide projection portion 105e and a positioning projection portion 105f. The guide projection portion 105e projects from a peripheral portion of the rear surface 105d, and has a ring shape. The positioning projection portion 105f is located outside the guide projection portion 105e, and has a ring shape. The positioning projection portion 105f contacts a front face of the spacer projection 106 formed with the holder barrel portion 62, so as to regulates a position of the taking lens 105 in the optical axis direction. The guide projection portion 105e frictionally contacts the front face of the aperture changing plate 54 entering the holder barrel portion 62 through the passage cutout 62b. Thus, the guide projection portion 105e regulates a position of the aperture changing plate 54 in the optical axis direction.

Note that, in the present embodiment, the flare stopper 67 may be added to a position behind the taking lens 105 in a manner similarly the above embodiment.

In both embodiments, the guide projection portions 66b and 105e are in the ring shape. However, the guide projection portions 66b and 105e for contacting the aperture changing plate 54 may have other shapes, for example may include a train of spot-shaped projections, and the like.

In the above embodiment, the photometric unit and solenoid are used for controlling the aperture changing plate 54. However, other structures may be used. For example, the construction in the co-pending U.S. patent application (corresponding to the Japanese patent application No. 2000-280538) may be used, in which the aperture changing plate 54 is shifted according to a manual operation of the flash charger button 8. At the time of normally taking an exposure, the aperture changing plate 54 may be kept in the small diameter position. At the time of taking an exposure with flash, the aperture changing plate 54 may be kept in the large diameter position. Furthermore, it is also possible to use a manually operable aperture changing button or switch for designating a selected one of a small diameter position and a large diameter position. According to a set position of the button or switch, the aperture changing plate 54 may be set.

In the above embodiments, the aperture stop changing device 34 is used in a lens-fitted photo film unit. However, the aperture stop changing device 34 of the present invention may be used in a compact camera, any of various types of camera, or other optical instruments. In the above embodiments, the photo film is 135 type. However, photo film of the IX 240 type may be use.

In the above embodiment, the aperture changing plate 54 includes the stop-down opening 76 being single. However, the aperture changing plate 54 may have large and small openings. The aperture changing plate 54 may be shifted between first and second positions, and when in the first position, sets the large opening at the optical axis, and when in the second position, sets the small opening at the optical axis.

If dust, sand or foreign matter should happen to enter the lens-fitted photo film unit 2 and reach the mechanical elements, the lens holder 53 and the retention plate 69 enclose the inner space to protect the aperture changing plate 54 in the accommodated state. Thus, it is possible to prevent dust, sand or foreign matter to come between the taking lens 5 and the aperture changing plate 54. According to this, it is possible to change the position of the aperture changing plate 54 with high reliability.

In the first embodiment, the spacer 68 has a U shape. However, the spacer 68 may have other suitable shapes. The spacer 68 can allow the aperture changing plate 54 to move in the passage gap or cutout defined by the spacer 68 between the front and rear lens elements 65 and 66. For example, the spacer 68 may have an arc shape longer or shorter than an arc of a semi-circle. Also, the spacer 68 may include two or more parts for being squeezed by the front and rear lens elements 65 and 66.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An aperture stop changing device for a camera, said camera including a preset open aperture disposed on an exposure light path, and a taking lens comprising first and second lens elements disposed in said light path, said aperture stop changing device comprising:

an aperture changing plate, including a stop-down opening having a smaller diameter than said preset open aperture, disposed close to said taking lens, being movable between a small diameter position and a large diameter position, wherein, said stop-down opening, when said aperture changing plate is in said small diameter position, is set in said light path, and when said aperture changing plate is in said large diameter position, is set away from said light path; and a spacer sandwiched between the first and second lens elements for defining a space to contain said aperture changing plate, said spacer having a first cutout for partially receiving said aperture changing plate moving between said small and large diameter positions.

2. The aperture stop changing device of claim 1, wherein the spacer is sandwiched by partial sections of peripheral portions of the first and second lens elements opposed to one another.

3. The aperture stop changing device of claim 2, further comprising a flare stopper arranged along an optical axis, wherein the spacer is in direct contact with both the flare stopper and one of the first and second lens elements.

4. The aperture stop changing device of claim 3, wherein the lens element with which the spacer is in direct contact is nearest a film plane of the camera.

5. The aperture stop changing device of claim 4, wherein the flare stopper is in direct contact with one of the first and second lens elements.

6. An aperture stop changing device as defined in claim 1, wherein said camera is a lens-fitted photo film unit preloaded with photo film.

7. An aperture stop changing device for a camera, said camera including a preset open aperture disposed on an exposure light path, and a taking lens disposed in said light path, and having at least one lens element, said aperture stop changing device comprising:

an aperture changing plate, including a stop-down opening having a smaller diameter than said preset open aperture, disposed close to said taking lens, being movable between a small diameter position and a large diameter position, wherein, said stop-down opening, when said aperture changing plate is in said small diameter position, is set in said light path, and when said aperture changing plate is in said large diameter position, is set away from said light path;

a spacer, disposed adjacent a peripheral portion of said taking lens, for defining a space to contain said aperture changing plate, said spacer having a first cutout for partially receiving said aperture changing plate moving between said small and large diameter positions; and a guide projection portion, formed to project from said peripheral portion of said taking lens toward said aperture changing plate, for contacting said aperture changing plate being moved, to regulate said aperture changing plate in an optical axis direction of said taking lens.

8. An aperture stop changing device as defined in claim 7, further comprising a lens holder, disposed behind said taking lens;

said lens holder including:
a plate portion having said preset open aperture;
a holder barrel portion, disposed about said preset open aperture, for projecting cylindrically from said plate portion, and for containing said taking lens;
wherein said holder barrel portion has a second cutout for receiving said aperture changing plate.

9. An aperture stop changing device as defined in claim 8, wherein said guide projection portion is a ring-shaped ridge.

10. An aperture stop changing device as defined in claim 8, further comprising:
a retention plate, disposed in front of said taking lens, for securing said taking lens to said holder barrel portion;
a third cutout formed with said holder barrel portion or said retention plate; and a retention projection formed to project from a peripheral edge of said taking lens, fitted on said third cutout, for retaining said taking lens on said holder barrel portion or said retention plate.

11. An aperture stop changing device as defined in claim 10, wherein said retention plate includes a ring-shaped outer ridge fitted on a peripheral edge of said holder barrel portion.

12. An aperture stop changing device as defined in claim 11, further comprising:
a bias member for biasing said aperture changing plate to said small diameter position;
a stopper, disposed in a moving path of said aperture changing plate, for contacting said aperture changing plate moved by said bias member, to keep said aperture changing plate from moving beyond said small diameter position.

13. An aperture stop changing device as defined in claim 12, wherein said retention plate includes a ring-shaped inner ridge disposed inside said outer ridge, for pushing said peripheral portion of said taking lens.

14. An aperture stop changing device as defined in claim 13, wherein said taking lens includes a ring-shaped positioning ridge for being contacted on said inner ridge.

15. An aperture stop changing device as defined in claim 8, wherein said spacer is a spacer projection formed to project from said lens holder for receiving a rear of said peripheral portion of said taking lens.

16. An aperture stop changing device as defined in claim 15, wherein said aperture changing plate is disposed between said taking lens and said plate portion of said lens holder, said guide projection portion projects from a rear surface of said taking lens, and said spacer projection has a projecting amount more than a height of said guide projection portion.

17. An aperture stop changing device as defined in claim 16, wherein said taking lens includes a ring-shaped positioning projection for being contacted on said spacer projection.

18. An aperture stop changing device as defined in claim 10, wherein said at least one lens element is at least first and second lens elements;
said spacer is disposed between said first and second lens elements.

19. An aperture stop changing device as defined in claim 18, wherein said second lens element is disposed in front of said first lens element, and said guide projection portion projects from a front surface of said first lens element, and said retention projection projects from said second lens element.

20. An aperture stop changing device as defined in claim 19, further comprising a ring-shaped flare stopper, disposed between said second lens element and said spacer so that said aperture changing plate overlaps thereon, for blocking light traveling away from said light path, to prevent flare.

21. An aperture stop changing device as defined in claim 10, further comprising a support pin formed to project forwards from said lens holder, for supporting said aperture changing plate in a rotatable manner;
wherein said lens holder and said retention plate are disposed to cover a moving path of said aperture changing plate between said small and large diameter positions.

22. An aperture stop changing device as defined in claim 8, wherein said aperture changing plate has a driven end;
further comprising:
a solenoid, having a plunger slidable between first and second positions;
a transmission mechanism, connected between said plunger and said aperture changing plate, having a driving portion movable into and out of a moving path of said driven end, wherein said driving portion, if said plunger is in said first position, is away from said driven end for setting said aperture changing plate in said small diameter position, and if said plunger is in said second position, pushes said driven end for setting said aperture changing plate in said large diameter position.

23. An aperture stop changing device as defined in claim 22, further comprising:
a photometric unit for measuring object brightness;
a control circuit for controlling said solenoid according to comparison of said object brightness with reference brightness, to set said plunger from said first position to said second position if said object brightness is lower than said reference brightness.

24. An aperture stop changing device as defined in claim 23, further comprising a first bias member for biasing said aperture changing plate toward said small diameter position;
wherein said transmission mechanism includes:
a rotatable stopper lever, secured to and moved by said plunger, being in a stopping position when said plunger is in said first position, and being in a retreating position when said plunger is in said second position;
a transmission lever, movable between a charged position and a non-charged position, moved to said charged position by photo film winding operation, retained in said charged position by said stopper lever in said stopping position, including said driving portion, when said stopper lever moves to said retreating position, said transmission lever moves to said non-charged position, to set said aperture changing plate from said small diameter position to said large diameter position by pressure of said driving portion to said driven end;
a second bias member for biasing said transmission lever toward said non-charged position.

25. An aperture stop changing device for a camera, said camera including a preset open aperture disposed on an exposure light path, and a taking lens disposed in said light path, and having at least one lens element, said aperture stop changing device comprising:
an aperture changing plate, including a stop-down opening having a smaller diameter than said preset open aperture, disposed close to said taking lens, being movable between a small diameter position and a large diameter position, wherein said stop-down opening, when said aperture changing plate is in said small diameter position, is set in said light path, and when said aperture changing plate is in said large diameter position, is set away from said light path; and
a guide projection portion, formed to project from a peripheral portion of said taking lens toward said aperture changing plate, for contacting said aperture changing plate being moved, to regulate said aperture changing plate in a direction of said light path.

26. An aperture stop changing device as defined in claim 25, further comprising a spacer, disposed behind said peripheral portion of said taking lens, for defining a space to contain said aperture changing plate, said spacer having a first cutout for partially receiving said aperture changing plate moving between said small and large diameter positions.

27. An aperture stop changing device as defined in claim 26, further comprising:

a lens holder, disposed behind said taking lens, for supporting said taking lens;

a retention plate, disposed in front of said taking lens, for securing said taking lens to said lens holder;

a second cutout formed with said lens holder or said retention plate; and a retention projection formed to project from a peripheral edge of said taking lens, fitted on said second cutout, for retaining said taking lens on said lens holder or said retention plate.

28. An aperture stop changing device as defined in claim 27, wherein said guide projection portion is a ring-shaped ridge.

* * * * *